(12) United States Patent
Reichler et al.

(10) Patent No.: US 9,043,101 B2
(45) Date of Patent: May 26, 2015

(54) ARRANGEMENT AND METHOD FOR CONTROLLING AN AUTOMATICALLY SHIFTING TRANSMISSION

(71) Applicant: Bayerische Motoren Werke Aktiengesellschaft, Munich (DE)

(72) Inventors: Matthias Reichler, Munich (DE); Andreas Segerer, Gilching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/279,832

(22) Filed: May 16, 2014

(65) Prior Publication Data

US 2014/0343809 A1    Nov. 20, 2014

(30) Foreign Application Priority Data

May 17, 2013    (DE) .......................... 10 2013 209 265

(51) Int. Cl.
 *F16H 61/68*    (2006.01)
(52) U.S. Cl.
 CPC ....................................... *F16H 61/68* (2013.01)
(58) Field of Classification Search
 USPC ........................................................ 701/52, 58
 See application file for complete search history.

(56) References Cited

U.S. PATENT DOCUMENTS

| | | | |
|---|---|---|---|
| 6,035,735 A | 3/2000 | Graf et al. | |
| 7,490,527 B2 | 2/2009 | Fuchs et al. | |
| 8,571,770 B2 | 10/2013 | Wakamatsu et al. | |

(Continued)

FOREIGN PATENT DOCUMENTS

| | | |
|---|---|---|
| DE | 43 11 886 A1 | 10/1994 |
| DE | 197 36 406 A1 | 3/1999 |
| DE | 199 35 956 A1 | 2/2001 |
| DE | 100 18 661 A1 | 11/2001 |

(Continued)

OTHER PUBLICATIONS

German Search Report dated Oct. 14, 2013, with English translation (Nine (9) pages).

*Primary Examiner* — Edwin A Young
(74) *Attorney, Agent, or Firm* — Crowell & Moring LLP

(57) ABSTRACT

In an arrangement for controlling an automatically shifting transmission, as a result of a corresponding programming of an electric control device, when actuating a second selecting device, starting from the automatic mode, first an immediate upshifting or downshifting can be prompted and is permitted unless prevented by a specified condition. In the case of a brief actuation, a first or further immediate upshifting and/or downshifting can be prompted and the current or thereby reached gear will be maintained until, first, the duration of the actuation has reached the specific minimum duration and, second, the actuation of the selecting device was terminated. When the second selecting device has a first operating element for the manual triggering of an upshift command and a second operating element for the manual triggering of a downshift command, the event controlling the return to the automatic mode may be the recognition of the simultaneously present commands downshifting and upshifting. After a first actuation of the second selecting device for the purpose of a manually prompted immediate up- or downshifting, a transition may immediately take place to the automatic gear change control according to the automatic mode, if subsequently thereto, an actuation of the second selecting device for the purpose of a gear change in a direction opposite thereto takes place within a comparatively brief time window.

13 Claims, 2 Drawing Sheets

(56) References Cited

U.S. PATENT DOCUMENTS

| | | | |
|---|---|---|---|
| 2011/0130928 A1* | 6/2011 | Matsunaga et al. | 701/52 |
| 2012/0004818 A1* | 1/2012 | Wakita et al. | 701/66 |
| 2012/0022756 A1* | 1/2012 | Ueno et al. | 701/58 |
| 2012/0078477 A1* | 3/2012 | Takashiro | 701/52 |
| 2012/0166053 A1* | 6/2012 | Nishida et al. | 701/52 |

FOREIGN PATENT DOCUMENTS

| | | |
|---|---|---|
| DE | 102 09 840 A1 | 9/2002 |
| DE | 10 2004 051 639 A1 | 4/2006 |
| DE | 10 2005 016 673 A1 | 10/2006 |
| DE | 10 2008 000 532 A1 | 9/2008 |

* cited by examiner

ARRANGEMENT AND METHOD FOR CONTROLLING AN AUTOMATICALLY SHIFTING TRANSMISSION

CROSS REFERENCE TO RELATED APPLICATIONS

This application claims priority under 35 U.S.C. §119 from German Patent Application No. 10 2013 209 265.2, filed May 17, 2013, the entire disclosure of which is herein expressly incorporated by reference.

BACKGROUND AND SUMMARY OF THE INVENTION

The invention relates to an arrangement for controlling an automatically shifting transmission for a motor vehicle having a first selecting device, by which at least the driving positions (for example, "P", "R", "N", "D") adjustable in an automatic mode can be set, and having a second selecting device (for example, +/–"paddles" at the steering wheel) by which an immediate upshifting and downshifting can be triggered.

Such an arrangement is known, for example, from German Patent Document DE 197 36 406 A1. This known arrangement has a first selecting device in the form of a selector lever by which the driving positions P, R, N, D adjustable in an automatic mode can be set. By way of a second selecting device in the form of a steering wheel having two switches, the gears of the transmission can be manually upshifted or downshifted in steps in a manual mode. The known arrangement has an electronic transmission control device that is customary in the case of automatic transmissions or automated manual transmissions.

The basic idea of the arrangement known from German Patent Document DE 197 36 406 A1 is that the manual mode is activated by actuating the second selecting device starting from the automatic mode.

In the case of the arrangement known from German Patent Document DE 10 2004 051 639 A1, as an alternative to the previously mentioned basic idea, when actuating the second selecting device, starting from the automatic mode, an immediate upshifting and downshifting, respectively, is permitted but no transition is carried out into the manual mode. A gear change following this upshifting and downshifting, respectively, is again carried out corresponding to the shifting logic of the automatic mode.

In the case of a multiple actuation of the second selecting device, multiple immediate upshifts or downshifts may also be permitted.

The temporary manual mode or the manually immediately permitted gear change starting from the automatic mode is normally maintained until certain conditions are present for the return to the automatic mode. In the simplest case, a condition for the return into the automatic mode may be the expiration of a predefined time period.

It is an object of the invention to provide an arrangement of the above-mentioned type which improves the influencing capability of the driver.

According to the invention, this and other objects are achieved by an arrangement and method for controlling an automatically shifting transmission for a motor vehicle having a first selecting device, by which at least the driving positions adjustable in an automatic mode can be set, having a second selecting device by which an immediate upshifting and/or downshifting can be triggered, and having an electronic control unit which, as a function of signals of the first and second selecting devices and further input signals, triggers control elements of the transmission. The control unit is configured such that, after actuation of the second selecting device, starting from an automatic mode, in a drive position, the next automatic gear change can only be carried out again in the automatic mode when, first, the second selecting device was actuated for a specified minimum duration and, second, the driver has terminated the actuation of the second selecting device.

By way of the arrangement according to the invention, when actuating the second selecting device, starting from the automatic mode, basically first an immediate upshifting or downshifting can be prompted and, as required, can be permitted if this is not prevented by a specified other condition. According to the invention, three alternatives are provided for the return to the automatic gear change control in the automatic mode:

Alternative 1

According to the invention, during a brief actuation of the second selecting device, a first or additional immediate upshifting or downshifting can be prompted or be triggered as required, and the current or thereby reached gear is maintained until, first, the duration of the actuation has reached a specified minimum duration and, second, the actuation of the second selecting device was terminated.

Alternative 2

When the second selecting device has a first operating element for the manual triggering of an upshift command and has a second operating element for the manual triggering of a downshift command, in addition or as an alternative, the event controlling the return may be the recognition of the simultaneously present opposite commands "downshift" and "upshift".

Alternative 3

Likewise, in addition or as an alternative, after a first actuation of the second selecting device for the purpose of a manually prompted immediate upshifting or downshifting, a transition can immediately take place to the automatic gear change control according to an automatic mode, if subsequently, an actuation of the second selecting device takes place for the purpose of a gear change in a direction opposite thereto within a comparatively short time window.

In the following, the above three mentioned alternatives, which can be used separately or in a combination with one another, will be explained in greater detail.

As basically known from the state of the art, by way of the arrangement according to the invention, as a result of a corresponding programming of the electric control unit, during the actuation of the second selecting device, starting from the automatic mode, first an immediate upshifting or downshifting is permitted if this is not prevented by another condition. Furthermore, according to the invention, the duration of the actuation of the second selecting device can detected. If, immediately upon this actuation, an upshifting or downshifting was permitted, the thereby engaged gear will be maintained at least for the duration of the actuation of the second selecting device. As a result, the driver can deliberately determine the minimum duration of maintaining this gear. However, a return to the automatic gear change control in the automatic mode will take place only if the second selecting device was actuated for a specified minimum duration. Therefore, in the case of a brief actuation, a first or further immediate up- or downshifting can be triggered and the thereby reached gear will be maintained until, first, the duration of the actuation has reached a specified minimum duration, and, second, the actuation of the selecting device was terminated.

In addition or as an alternative, the second selecting device has a first operating element for the manual triggering of an upshift command and a second operating element for the manual triggering of a downshift command. The electronic control unit will then be configured such that, after a manually prompted (actually triggered or suppressed) immediate upshifting or downshifting, starting from the automatic mode, in the case of a joint actuation of the first operating element and the second operating element, preferably for a predefined time period, in the control unit, an immediate transition to the automatic gear shifting control takes place again according to the automatic mode. This return to the automatic gear shifting control is therefore not time-controlled, but rather is event-controlled. The event controlling the return is therefore the recognition of the simultaneously, or at least closely successively, present opposite commands "downshift" and "upshift". The second possibility mentioned here will be implemented in detail as follows.

Independently of whether the second selecting device has only one operating element (for example, a shift paddle with + and − positions) or a first operating element for the manual triggering of an upshift command and a second operating element for the manual triggering of a downshift command (for example, + paddle and − paddle at the steering wheel), in addition or as an alternative, the control unit can be further developed as follows.

During a first actuation of the selecting device, for example, for the purpose of an upshifting, an immediate upshift can first be prompted. When, within a comparatively short time window after the letting-go of the corresponding operating element, the second selecting device is actuated for the purpose of a downshifting, this actuation leads back immediately to the automatic gear change control according to the automatic mode and, at first, not to the immediate downshifting. This control is analogously applicable, starting from a manually prompted immediate downshifting. Summarizing, the following therefore applies: After a first actuation of the second selecting device for the purpose of a manually prompted immediate upshifting or downshifting, an immediate transition takes place to the automatic gear change control according to the automatic mode, if subsequently an actuation of the second selecting device takes place for the purpose of a gear change opposite thereto within a comparatively brief defined time window.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
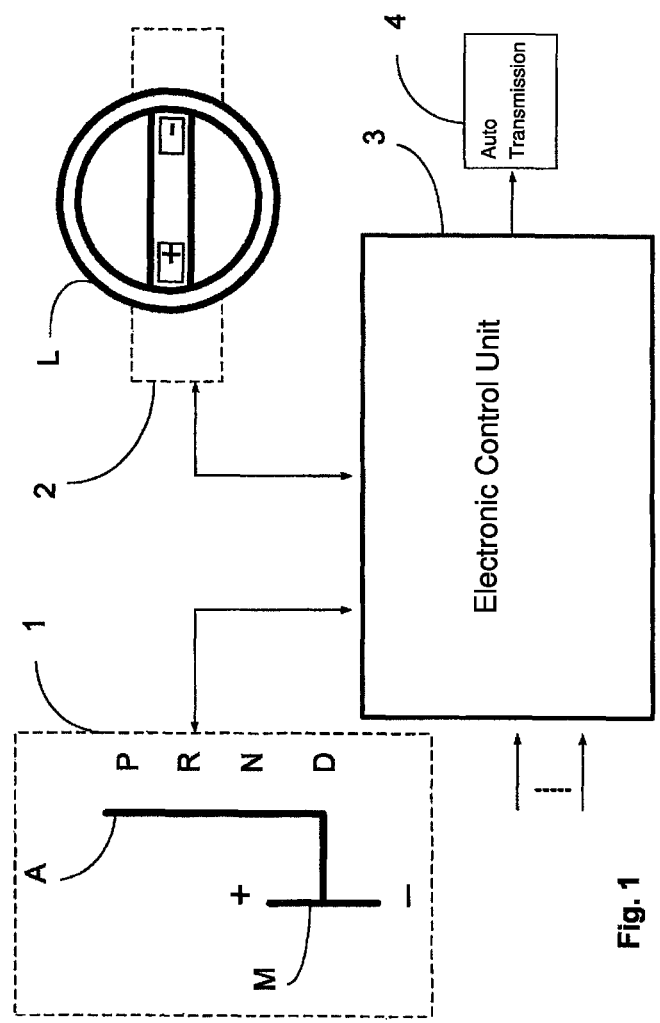
FIG. 1 is a schematic block diagram of an overall exemplary arrangement advantageous for the invention.

FIG. 1 illustrates an arrangement for controlling an automatic transmission 4 for a motor vehicle having a first selecting device 1 in the form of a selector lever. The selector lever can be moved in at least one shifting gate (first gate) for setting the driving positions P, R, N, and D, in which drive position D the transmission is adjustable in an automatic mode A. Furthermore, a second selecting device 2 in the form of an upshift key (for example, a known so-called "+ paddle") and of a downshift key (for example, a known so-called "− paddle") are illustrated here at a steering wheel L of the motor vehicle. By use of these shift paddles, the gears of the transmission 4 can basically be manually upshifted or downshifted in steps in a manual mode M, if, starting from the automatic mode A, another operating element, (here, the selecting device 1), was actuated for the switch-over into the manual mode M before the actuation of the second selection device. In the illustrated example, for the switch-over into the manual mode M, the first selecting device 1 has to be moved at least into the second gate, in which the gears of the transmission 4 may also be manually up- or downshiftable in steps by way of an upshifting and downshifting key.

Furthermore, an electronic control unit 3 is present which receives different input signals, including the signals of the first and second selecting devices 1, 2. As a function of these input signals, by way of a programmed shifting logic, control elements of the automatic transmission 4 are controlled for the changing and engaging of specified gears. When the second selecting device 2 is actuated without any previous actuation of the other operating element 1, which is provided for the switch-over into the manual mode M, an immediate upshifting and downshifting respectively is also carried out. This is where the invention starts.

Figure 2:
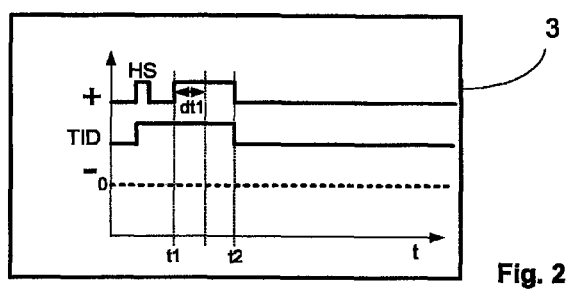
FIG. 2 is a graphical view of an embodiment concerning the above-mentioned first alternative.
Figure 3:
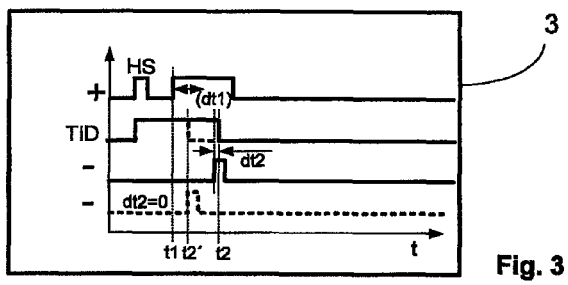
FIG. 3 is a graphical view of an embodiment concerning the above-mentioned second embodiment.
Figure 4:
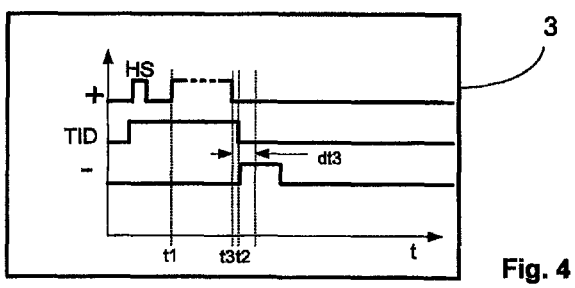
FIG. 4 is a graphical view of an embodiment concerning the above-mentioned third embodiment.

Examples concerning the three above-mentioned alternatives are described in FIGS. 2 to 4. In the Figures, with the occurrence of a high level of the TID ("tip in D") signal, here, for example, one immediately triggered upshifting (HS) (or an at least prompted immediate upshifting (HS)) starting from the automatic mode A is respectively illustrated. A descending flank to the low-level of the TID signal illustrates the return to the automatic gear change control in the automatic mode A. By way of the high level of the + signal, the actuation of the "+ paddle" (=operating element of the second selecting device 2 for an upshift command) is illustrated. By way of the high level of the − signal, the actuation of the "− paddle" (=operating element of the second selecting device 2 for a downshift command) is illustrated. The point of time t1 represents the beginning of an actuation of the selecting device 2, which can lead to a time- or event-controlled return into the automatic mode. The actual return is in each case marked by the point in time t2.

According to FIG. 2, the electronic control unit 3 is configured, via appropriate programming, in a first alternative such that, when the second selecting device 2 is actuated, (here, for example, the "+ paddles"), starting from the automatic mode A, in the driving position D, an immediate upshifting HS can be prompted and, if required, also implemented. The next automatic gear change in the automatic mode A will then be carried out when, first, the second selecting device 2, in this embodiment, therefore the "+ paddle", was actuated for a specified minimum duration dt1, starting from another actuation at the point in time t1, and, second, the driver has terminated the actuation of the second selecting device 2 (here, has therefore let go of the "+ paddle" again at the point of time t2).

As an alternative or in addition, the electronic control unit 3 is configured, via appropriate programming, according to the second embodiment (the second alternative) according to FIG. 3 such that when the second selecting device 2 is actuated (here, for example, the "+ paddles"), starting from the automatic mode A, in the driving position D, an immediate upshifting—here, again the upshifting HS—can be prompted and, if required, also permitted. The transition takes place from the control unit 3 immediately to the automatic gear change control according to the automatic mode A when the following condition is present: the first operating element of the selecting device 2 in the form of the "+ paddle" for the manual upshifting and the second operating element of the selecting device 2 in the form of the "− paddle" for the manual downshifting are preferably actuated jointly for a comparatively brief time duration dt2, which may also be zero. FIG. 3 illustrates two cases (solid lines with t2 as the return point in time, and broken lines with t2' as the return point in time) for two different points in time, at which the second operating element ("− paddle") is additionally operated.

Likewise, as an alternative or in addition, the electronic control unit 3 according to the third embodiment (the third alternative) according to FIG. 4 is configured, via appropriate programming, such that when the second selecting device 2 is actuated (here, for example, the "+ paddles"), starting from the automatic mode A, in the driving position D, an immediate upshifting—here, the upshifting HS—can be prompted and, if required, also permitted, and that the transition takes place from the control device 3 immediately to the automatic gear change control according to the automatic mode when the following condition is present: The other operating element (here"− paddle") of the selecting device 2 is actuated within a comparatively short time window dt3 after the letting-go of the first operating element (here" "+ paddle") at the point in time t3.

By way of this invention, on the one hand, the driver's performance intentions and, on the other hand, the demands for an optimal comfort are taken into account.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling an automatically shifting transmission for a motor vehicle equipped with a first selecting device by which at least driving positions, adjustable in an automatic mode, are settable and a second selecting device by which an immediate upshifting and/or downshifting is triggerable, the method comprising the acts of:
   actuating the second selecting device in the automatic mode to carry out the immediate upshifting or downshifting in a drive position D; and
   only carrying out again in the automatic mode a next automatic gear change when:
   (i) first, the second selecting device was actuated for a specified minimum duration, and
   (ii) second, actuation of the second selecting device has been terminated.

2. The method according to claim 1, wherein:
   after an expiration of the specified minimum duration, providing an indication to a driver that an automatic gear change can only be carried out again after terminating the actuation of the second selecting device.

3. The method according to claim 1, wherein:
   when the second selecting device is actuated to carry out a manual downshift command, an automatic gear change control according to the automatic mode is immediately implementable despite a lowest-possible gear in the transmission being engaged.

4. The method according to claim 3, wherein:
   when the second selecting device is actuated to carry out a manual upshift command, an automatic gear change control according to the automatic mode is immediately implementable despite the highest-possible gear in the transmission being engaged.

5. The method according to claim 1, wherein:
   when the second selecting device is actuated to carry out a manual upshift command, an automatic gear change control according to the automatic mode is immediately implementable despite the highest-possible gear in the transmission being engaged.

6. The method according to claim 1, wherein the second selecting device comprises a first operating element for manually triggering an upshift command and a second operating element for manually triggering a downshift command, the method further comprises the act of:
   when the first operating element and the second operating element are actuated jointly, an automatic gear change control according to the automatic mode is immediately implementable.

7. The method according to claim 1, further comprising the acts of:
   after a first actuation of the second selecting device for manually prompting an immediate upshifting or downshifting, an automatic gear change control according to the automatic mode is implemented again only when, subsequently thereto, an actuation of the second selecting device for a gear change in an opposite direction thereto takes place within a defined time window.

8. A control arrangement for an automatically shifting transmission of a motor vehicle, comprising:
   a first selecting device by which at least driving positions P, R, N, D, adjustable in an automatic mode, are selected;
   a second selecting device by which an immediate upshifting and/or downshifting is triggerable;
   an electronic control unit operatively configured to execute a control program that:
      triggers control elements of the transmission as a function of signals of the first and second selecting devices;
      in drive position D, after actuating the second selecting device in the automatic mode, only carries out again a next automatic gear change in the automatic mode when, first, the second selecting device was actuated for a specified minimum duration and, second, actuation of the second selection device has been terminated.

9. The arrangement according to claim 8, wherein the electronic control unit is further configured to, after an expiration of the specified minimum duration, providing an indication to a driver that an automatic gear change can only be carried out again after terminating the actuation of the second selecting device.

10. The arrangement according to claim 8, wherein the electronic control unit is further configured such that, when the second selecting device is actuated to carry out a manual downshift command, an automatic gear change control according to the automatic mode is immediately implementable despite a lowest-possible gear in the transmission being engaged.

11. The arrangement according to claim 10, wherein the electronic control unit is further configured such that, when the second selecting device is actuated to carry out a manual upshift command, an automatic gear change control according to the automatic mode is immediately implementable despite the highest-possible gear in the transmission being engaged.

12. The control arrangement according to claim 8, wherein the second selecting device comprises a first operating element for manually triggering an upshift command and a second operating element for manually triggering a downshift command, the electronic control unit being further configured such that, when the first operating element and the second operating element are actuated jointly, an automatic gear change control according to the automatic mode is immediately implementable.

13. The arrangement according to claim 8, wherein the electronic control unit is further configured such that, after a first actuation of the second selecting device for manually prompting an immediate upshifting or downshifting, an automatic gear change control according to the automatic mode is implemented again only when, subsequently thereto, an actuation of the second selecting device for a gear change in an opposite direction thereto takes place within a defined time window.

\* \* \* \* \*